United States Patent
Hamilton et al.

(10) Patent No.: US 6,562,869 B1
(45) Date of Patent: *May 13, 2003

(54) NUTRITIONAL SUPPLEMENT FOR INCREASED ENERGY AND STAMINA

(75) Inventors: Nathan D. Hamilton, San Francisco, CA (US); Benjamin V. Treadwell, Marco Island, FL (US)

(73) Assignee: Juvenon, Inc., Orinda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/996,072

(22) Filed: Nov. 27, 2001

Related U.S. Application Data

(63) Continuation-in-part of application No. 09/658,361, filed on Sep. 8, 2000, now Pat. No. 6,479,069.
(60) Provisional application No. 60/156,028, filed on Sep. 23, 1999, and provisional application No. 60/223,465, filed on Aug. 7, 2000.

(51) Int. Cl.$^7$ .................. A61K 31/19; A61K 31/20; A61K 31/14; A61K 35/78; A61K 47/00
(52) U.S. Cl. .................. 514/557; 514/557; 514/558; 514/642; 424/195.1; 424/439; 424/655
(58) Field of Search .................. 514/557, 558, 514/642; 424/195.1, 439, 655

(56) References Cited

U.S. PATENT DOCUMENTS

| | | | |
|---|---|---|---|
| 3,810,994 A | 5/1974 | Wiegand | 424/316 |
| 4,343,816 A | 8/1982 | Cavazza | 424/316 |
| 4,401,827 A | 8/1983 | de Witt | 560/1 |
| 4,599,232 A | 7/1986 | Bertelli | 424/94 |
| 4,687,782 A | 8/1987 | Brantman | 514/561 |
| 4,751,242 A * | 6/1988 | Calvani et al. | 514/554 |
| 4,839,159 A | 6/1989 | Winter | 424/59 |
| 4,859,698 A | 8/1989 | Cavazza et al. | 514/445 |
| 5,030,458 A | 7/1991 | Shug et al. | 426/2 |
| 5,030,657 A | 7/1991 | Burtle et al. | 514/556 |
| 5,089,269 A | 2/1992 | Noda et al. | 424/456 |
| 5,240,961 A | 8/1993 | Shug | 514/556 |
| 5,260,464 A | 11/1993 | Della Valle et al. | 554/80 |
| 5,292,538 A | 3/1994 | Paul et al. | 426/74 |
| 5,326,699 A | 7/1994 | Torishima et al. | 435/240.2 |
| 5,362,753 A | 11/1994 | Blum et al. | 514/556 |
| 5,391,550 A | 2/1995 | Carniglia et al. | 514/48 |
| 5,472,698 A | 12/1995 | Rawlings et al. | 424/401 |
| 5,504,072 A | 4/1996 | Schmidl et al. | 514/21 |
| 5,536,645 A | 7/1996 | Jay | 435/32 |
| 5,536,699 A | 7/1996 | Ghelfi et al. | 502/400 |
| 5,560,928 A | 10/1996 | DeFelice | 424/466 |
| 5,607,980 A | 3/1997 | McAtee et al. | 514/476 |
| 5,626,849 A * | 5/1997 | Hastings et al. | 424/195.1 |
| 5,504,072 A | 8/1997 | Schmidl et al. | 514/21 |
| 5,665,364 A | 9/1997 | McAtee et al. | 424/401 |
| 5,709,868 A | 1/1998 | Perricone | 424/401 |
| 5,728,735 A * | 3/1998 | Ulrich et al. | 514/74 |
| 5,821,237 A | 10/1998 | Bisset et al. | 514/75 |
| 5,889,055 A | 3/1999 | Howard | 514/561 |
| 5,916,912 A | 6/1999 | Ames | 514/440 |
| 5,977,162 A | 11/1999 | Seidman | 514/440 |
| 6,048,886 A | 4/2000 | Neigut | 514/412 |
| 6,140,512 A | 10/2000 | Adger et al. | 549/39 |
| 6,261,575 B1 | 7/2001 | Hoppe et al. | 424/401 |
| 2001/0005719 A1 | 6/2001 | Von Borstel | 514/49 |

FOREIGN PATENT DOCUMENTS

| | | | |
|---|---|---|---|
| FR | 2725896 | 4/1996 | A61K/7/48 |
| JP | 11180851 | 7/1999 | |
| WO | WO 98/57627 | 12/1998 | A61K/31/195 |
| WO | WO 00/11968 | 3/2000 | A23L/1/30 |

OTHER PUBLICATIONS

Smith et al., J. Appl Physiol (1998), 85(4), 1349–56.*

R. J. Branconnier et al., "Recall and recognition as diagnostic indices of malignant memory loss in senile dementia: a Bayesian analysis", *Exp Aging Re*, vol. 8, No. 3–4, pp. 189–193 (Fall–Winter 1982) (Abstract).

M. Saleman,, "Brain tumors in elderly patients", *Am Fam Physician*, vol. 27, No. 4, pp. 137–143 (Apr. 1983) (Abstract).

J. L. Cummings et al., "Subcortial dementia. Review of an emerging concept" *Arch Neurol*, vol. 41, No. 8, pp. 874–879, (Aug. 1984) (Abstract).

D. W. Loring et al., Auditory evoked potentials in senescent forgetfulness, *Int J Neurosci*, vol. 24, No. 2, pp. 133–141 (Oct. 1984) (Abstract).

B. A. Campbell et al., "Animal models of infantile amnesia, benign senescent forgetfulness, and senile dementia", *Neurobehave Toxicol Teratol*, vol. 6, No. 6, pp. 467–471 (Nov.–Dec. 1984) (Abstract).

D. G. Milder et al., "Neuropathological findings in as case of coexistent progressive supranuclear palsy and Alzheimer's disease", *Clinical Exp Neurol*, vol. 20, pp. 181–187, (1984) (no month) (Abstract).

P. Langsjoen et al. "Response of patients in classes III and IV of cardiomyopathy to therapy in a blind and crossover trial with coenzyme Q10", *Proc. Natl., Acad. Sci.*, vol. 82, pp. 4240–4244, Jun. 1985.

W. M. Petrie, "Alzheimer's disease", *Compr Ther*, vol. 11, No. 7, pp. 38–43, (Jul. 1985) (Abstract).

(List continued on next page.)

*Primary Examiner*—Sreeni Padmanabhan
*Assistant Examiner*—S. Jiang
(74) *Attorney, Agent, or Firm*—Sierra Patent Group, Ltd.

(57) ABSTRACT

Supplemented food formulations are disclosed. A gelatin has a composition comprising an effective amount of an antioxidant having anti-aging properties, an effective amount of a carnitine having anti-aging properties, a carbohydrate source for calories, an effective amount of at least one B vitamin, and flavors.

12 Claims, No Drawings

OTHER PUBLICATIONS

W. H. Riege et al., "Brain glucose metabolism functions: age decrease factor scores" *J Gerontol*, vol. 40, No. 4, pp. 459–467, (Jul. 1985) (Abstract).

C. E. Wright et al., "The flash and pattern VEP as a diagnostic indicator of dementia", *Doc Ophthalmol*, vol. 62, No. 1, pp. 89–96, (Jan. 31, 1986) (Abstract).

C. M. Poser et al., "Benign encephalopathy of pregnancy. Preliminary clinical observations", *Acat Neurol Scand*, vol. 73, No. 1, pp. 39–43, (Jan. 1986) (Abstract).

J. V. Haxby, "Relations among age, visual memory, and resting cerebral metabolism in 40 healthy men", *Brain Cogn*, vol. 5, No. 4, pp. 412–427, (Oct. 1986) (Abstract).

C. Brayne et al., Normal aging, impaired cognitive function, and senile dementia of the Alzheimer's type: a continuum?, *Lancet*, vol. 1, No. 8597, pp. 1265–1267, (Jun. 4, 1988).

R. L. Martin et al., "A family–genetic study of dementia of Alzheimer's type", *Arch Gen Psychiatry*, vol. 45, No. 10, pp. 894–900, (Oct. 1988) (Abstract).

K. A. Bamford et al., "Does 'benign senescent forgetfulness' exist?", *Clin Geriart Med*, vol. 4, No. 4, pp. 897–916, (Nov. 1988) (Abstract).

C. G. Gottfries, "Dementia: classification and aspects of treatment", *Psychopharmacol Ser*, vol. 5, pp. 187–195, (1988) (no month) (Abstract).

C. Derouesne, " Neuropsychological testing for evaluation of brain aging", *Ann Med Interne*, (Paris) 141 Suppl, vol. 1, pp. 27–30, (1990) (no month) (Abstract).

K. Elrod et al., " Correlation of the amnestic effects of nicotine antagonists with inhibition of regional brain acetycholine synthase in rats", *J Pharmacol Exp Ther*, vol. 258, No. 2, pp. 403–409, (Aug. 1991) (Abstract).

V. Gallai et al., "A clinical and neurophysiological trial on nootropic drugs in patients with mental decline", *Acta Neurol*, (Napoli), vol. 13, No. 1, pp. 1–12, (Feb. 1991) (Abstract).

W. P. Skelton III, M.D. et al., "Alzheimer's disease. Recognizing and treating a frustrating condition", *Postgrad Med*, vol. 90, No. 4, pp. 33–44, 37–41, (Sep. 15, 1991).

D. K. Rush et al., "Memory modulation with peripherally acting cholinergic drugs", *Psychopharmacology*, (Berl), vol. 106, No. 3, pp. 375–382, (1992) (no month) (Abstract).

W. D. Heiss et al., "PET correlates of normal and impaired memory functions", *Cerebovasc Brain Metab Rev*, vol. 4, No. 1, pp. 1–27, (Spring 1992) (Abstract).

C. LeBel et al., "Evaluation fo the Probe 2',7'–Dichlorofluorescin as an Indicator of Reactive Oxygen species Formation and Oxidative Stress", *Chem.Res. Toxicol*, pp. 227–231 (1992) (no month).

K. Adachi et al., A Deletion of Mitochondrial DNA in Murine Doxorubicin–induced Cardiotoxicity, *Biochemical and Biophysial Research Comm.*, vol. 195, No. 2, pp. 945–951 (Sep. 1993).

P. M. Grasby et al., "Activation of the human hippocampal formation during auditory–verbal long–term memory function", *Neurosci Lett*, vol. 163, No. 2, pp. 185–188, (Dec. 12, 1993) (Abstract).

K. E. Sundqvist et al., "Metabolic effects of propionate, hexanoate and propionylcarnitine in normoxia, ischaemia and reperfusion. Does an anaplerotic substrate protect the ischaemic myocardium?", *Eur Heart J*, vol. 15, No. 4, pp. 561–570, (Apr. 1994) (Abstract).

P. R. Rapp et al., "Memory systems in normal and pathological aging", *Curr Opin Neurol*, vol. 7, No. 4, pp. 294–298, (Aug. 1994) (Abstract).

O. J. Heinonen et al., "Moderate carnitine depletion and long–chain fatty acid oxidation, exercise capacity, and nitrogen balance in the rat", *Pediatr Res*, vol. 36, No. 3, pp. 288–292, (Sep. 1994) (Abstract).

M. K. Shigenaga et al., "Oxidative damage and mitochondrial decay in aging", *Proc. Natl Acad Sci*, (USA), vol. 91, pp. 10771–10778, (Nov. 1994).

Z. Guan et al., "Content and Fatty Acid Composition of Cardiolipin in the Brain of Patients with Alzheimer's Disease", *Neurochem Int.*, vol. 25, No. 3, pp. 295–300 (1994) (no month).

O. Pastoris et al., "Age–related alterations of skeletal muscle metabolism by intermittent hypoxia and TRH–analog treatment", *Pharmacological Research*, vol. 30, No. 2, pp. 171–185, (Aug.–Sep. 1994) (Abstract).

P. C. Fletcher et al., "Brain systems for encoding and retrieval of auditory–verbal memory. An in vivo study in humans", *Brain*, vol. 118, Part 2, pp. 401–416, (Apr. 1995) (Abstract).

F. Eustache et al., "Healthy aging, memory subsystems and regional cerebral oxygen consumption", *Neuropsychologia*, vol. 33, No. 7, pp. 867–887, (Jul. 1995) (Abstract).

P. C. Fletcher et al., "The functional anatomy of memory", *Experientia*, vol. 51, No. 12, pp. 1197–1207, (Dec. 1995) (Abstract).

J. Jolles et al., "Cognitive impairment in elderly people. Predisposing factors and implications for experimental drug studies", *Drugs Aging*, vol. 7, No. 6, pp. 459–479, (Dec. 1995) (Abstract).

L. Nyberg et al., "Age differences in episodic memory, semantic memory, and priming: relationships to demographic, intellectual, and biological factors", *J Gerontol BP Psychol Sci Soc*, vol. 51, No. 4, pp. 234–240, (Jul. 1996) (Abstract).

E. Salmon, "Regional brain activity during working memory tasks", *Brain*, vol. 119, Part 5, pp. 1617–1625, (Oct. 1996) (Abstract).

T. Hagen et al., "Mitochondrial decay in hepatocytes from old rats: Members potential declines, heterogeneity and oxidants increase", *Proc. Natl. Acad. Sci. USA*, vol. 94, pp. 3064–3069 (Apr. 1997).

C. Sobreira, "Mitochondrial encephalomyopathy with coenzyme Q10 deficiency", *Neurology*, No. 48, pp. 1238–1243 (May 1997).

H.K. N'averi et al., "Skeletal muscle lactate accumulation and creatine phosphate depletion during heavy exercise in cogestive heart failure. Cause of limited exercise capacity?", *Eur Heart J*, vol. 18, No. 12, pp. 1937–1945, (Dec. 1997) (Abstract).

P. Langsjoen et al., "Treatment of Hypertrophic Cardiomyopathy with coenzyme Q10", *Molec. Aspects Med.*, vol. 18 (Suppl.), pp. s145–s151. 1997 (no month).

R. Aejmelaeus et al., "Ubiquinol–10 and total peroxyl radical trapping capacity of LDL liproproteins during aging: the effects of Q–10 supplementation", *Molec. Aspects Med.*, vol. 18 (Supplement) pp. s113–s120 (1997) (no month) (Abstract).

M. Beal et al., "Coenzymes Q10 attenuates the 1–methyl–4–phenyl–1,2,3 tetrahydropyridine (MPTP) induced loss of striatal dopamine and dopaminergic axons in aged mice", *Brain Research*, vol. 783, pp. 109–114 (Feb. 1998) (Abstract).

K. B. Beckman et al., "The Free Radical Theory of Aging Matures", *Physiological Reviews*, vol. 78, No. 2, pp. 547–580, (Apr. 1998).

K. Lonnrot et al., "The effects of lifelong ubiquinone Q10 supplementation on the Q9 and Q10 tissue concentrations and life span of male rats and mice", *Biochemistry and Molecular Biology International*, vol. 44, No. 4, pp. 727–737 (Apr. 1998) (Abstract).

K. Lonnrot et al., "Control of arterial tone after long–term coenzyme Q10 supplementation in senescent rats", *British Jr. of Pharmacology*, vol. 124, No. 7, pp. 1500–1506 (Aug. 1998) (Abstract).

B. Barbiroli et al., "Aspects of human bioenergetics as studied in vivo by magnetic resonance spectroscopy", *Biochimie*, vol. 80, No. 10, pp. 847–853 (Oct. 1998) (Abstract).

S. Bermon et al., "Effects of creatine monohydrate ingestion in sedentary and weight–trained older adults", *Acta Physio Scand*, vol. 164, No. 2, pp. 147–155 (Oct. 1998) (Abstract).

T. Kalaiselvi "Effect of L—carnitine on the status of lipid peroxidation and antioxidants in aging rats", *J.Nutr. Biochem.*, vol. 9, pp. 575–581, Oct. 1998.

A. Linnane et al., "The universality of bioenergetic disease. Age–associated cellular bioenergetic degradation and amelioration therapy", *Ann N.Y. Acad. Sci.*, vol. 854, pp. 202–213 (Nov. 1998) (Abstract).

B. N. Ames, "Micronutrients prevent cancer and delay aging", *Toxicology Letters*, 102–103, pp. 5–18, (Dec. 28, 1998).

G. Lenaz et al. "Oxidative stress, antioxidant defenses and aging", *BioFactors*, vol. 8, No. 3–4, pp. 195–204 (1998) (no month) (Abstract).

J. Kaikkonen et al., "Determinants of plasma coenzyme Q10 in humans", *FEBS Letter*, vol. 443, No. 2, pp. 163–166 (Jan. 25, 1999) (Abstract).

C. Saliou et al., "Antioxidants modulate acute solar ultraviolet radiation–induced NF–kappa–B activation in a human keratinocycte cell line", *Free Radical Biology and Medicine*, vol. 26(1–2), pp. 174–183 (Jan. 1999) (Abstract).

A. Pfefferbaum et al., "In vivo brain concentrations of N–acetyl compounds, creatine, and choline in Alzheimer's disease", *Arch. Gen. Psychiatry*, vol. 56, No. 2, pp. 185–192 (Feb. 1999) (Abstract).

A. Pfefferbaum et. al., "In vivo spectroscopic quantification of the N–acetyl moiety, creatine, and choline from large volumes of brain gray and white matter: effects of normal aging", *Magnetic Reson. Med.*, vol. 41, No. 2, pp. 276–284, (Feb. 1999) (Abstract).

J. Keady et al., "The DIAL–log study 1: profiling the experience of people with dementia", *Br J Nurs*, vol. 8, No. 6, pp. 387–393, (Mar. 25–Apr. 7, 1999) (Abstract).

T. Blatt et al, "Modulation of oxidative stresses in human aging skin", *Zeitschrift Fur Gerontologie Und Geriatrie*, vol. 32, No. 2, pp. 83–88 (Apr. 1999) (Abstract).

J. Challem, "Toward a new definition of essential nutrients: is it now time for the third 'vitamin' paradigm?", *Medical Hypotheses*, vol. 52, No. 5, pp. 417–422 (May 1999) (Abstract).

D. L. Hoyert et al., "Mortality from Alzheimer's disease: an update", *Natl Vital Stat Rep*, vol. 47, No. 20, pp. 1–8, (Jun. 30, 1999) (Abstract).

N. Schuff et al., "Age–related metabolite changes and volume loss in the hippocampus by magnetic resonance spectroscopy and imaging", *Neurobiology of Aging*, vol. 20, No. 3, pp. 279–285 (May–Jun. 1999) (Abstract).

K. Overvad et al., "Coenzyme Q10 in health and disease", *European Jr. of Clinical Nutrition*, vol. 53, No. 10, pp. 764–770 (Oct. 1999) (Abstract).

M. Tomasetti et al., "Coenzyme Q10 enrichment decreases oxidative DNA damage in human lymphocytes", *Free Radical Biology & Medicine*, vol. 27, No. 9–10, pp. 1027–1032 (Nov. 1999) (Abstract).

M. Turunen et al., "Blood concentration of coenzyme Q10 increases in rats when esterified forms are administered", *Jr. of Nutrition*, vol. 129, No. 12, pp. 2113–2118 (Dec. 1999) (Abstract).

T. Kagan, "Coenzyme Q10 Can in some circumstances block apoptosis, and this effect is mediated through mitochondria", *Ann N.Y. Acad. Sci.*, vol. 887, pp. 31–47 (1999) (no month) (Abstract).

A. Lass et al., "Mitochondrial coenzyme Q content and aging", *BioFactors*, vol. 9, No. 2–4, pp. 199–205 (1999) (no month) (Abstract).

H, Pedersen et al., "High serum coenzyme Q10, positively correlated with age, selenium and cholesterol, in Inuit of Greenland. A pilot study", *BioFactors*, vol. 9, pp. 319–323 (1999) (no month).

J. Huertas et al., "Virgin olive oil and coenzyme Q10 protect heart mitochondria from peroxidative damage during aging", *BioFactors*, vol. 9, No. 2–4, pp. 337–343 (1999) (no month) (Abstract).

J. Brooks, PhD. et al., "Assessment of Executive Function in Patients with Mild Traumatic Brain Injury", *The Journal of Trauma: Injury, Infection, and Critical Care*, vol. 46, No. 1, pp. 159–163, (1999) (no month).

S. D. Gale et al., "MRI, Quantitative MRI, SPECT, and neuropsychological findings following carbon monoxide poisoning", *Brain Injury*, vol. 13, No. 4, pp. 229–243, (1999) (no month).

J. Jang et al., "Application of biological monitoring to the quantitative exposure assessment for neuropsychological effect by chronic exposure to organic solvents", *Int Arch Occup Environ Health*, vol. 72, pp. 107–114, (1999) (no month).

F. Rosenfeldt et al., "Coenzyme Q10 improves the tolerance of the senescent myocardium to aerobic and ischemic stress: studies in rats and in human atrial tissue", *Biofactors*, vol. 9, No. 2–4, pp. 291–299, (1999) (no month) (Abstract).

E. S. Rawson et al., "Acute creatine supplementation in older men", *Int J. Sports Med.*, vol. 21, No. 1, pp. 71–75 (Jan. 2000) (Abstract).

O. Pastoris et al, "The effects of aging on enzyme activities and metabolite concentrations in skeletal muscle from sedentary male and female subjects", *Experimental Gerontology*, vol. 35, No. 1, pp. 95–104 (Feb. 2000) (Abstract).

G. Ravaglia et al. "Effect of micronutrient status on natural killer cell immune function in healthy free–living subjects aged $\geq$90 y", *Am J. Clin. Nutr*, vol. 71, No. 2, pp. 2113–2118, (Feb. 2000) (Abstract).

* cited by examiner

NUTRITIONAL SUPPLEMENT FOR INCREASED ENERGY AND STAMINA

CROSS-REFERENCE TO RELATED APPLICATION

The present application is a continuation-in-part to U.S. patent application Ser. No. 09/658,361, now U.S. Pat. No. 6,479,069 which claims benefit of U.S. Provisional Application Ser. No. 60/156,028, filed, Sep. 23, 1999 which claims benefit of U.S. Provisional Application Ser. No. 60/223,465, filed Aug. 7, 2000, entitled "Nutritional Supplement for Increased Energy and Stamina", filed on Sep. 8, 2000, which is incorporated herein in its entirety.

BACKGROUND

The present application is generally directed to dietary supplements and nutritional beverages. More specifically, it relates to the addition of the combination of lipoic acid and carnitine with these compositions.

Liquid diet supplements or nutritional drinks have been used for years to provide needed calories, protein, vitamins and minerals to people too sick or frail to eat sufficient amounts of solid food. Now these products are being marketed as energy boosters to people who want to remain energetic, particularly those aged 50 and older. The oldest, and by far the best selling, nutritional drink is made by the Ross Products Division of Abbott Laboratories (Columbus, Ohio). For 1997, its sales exceeded $170 million, which does not even include the higher-calorie Ensure Plus® or the lower calorie Ensure Light® beverages. Another competitor for active older consumers is Sandoz Nutrition (Minneapolis, Minn.) which sells ReSource®, the official nutritional drink of the senior Professional Golf Association tour. Mead Johnson Nutritionals (Evansville, Ind.) also has been marketing its Boost® drink to seniors.

Nutritional drinks are sold in a variety of flavors and supply approximately the following:

| | |
|---|---|
| Calories: | 180–350 kcal |
| Total Fat: | 0–13 grams |
| Sodium: | 130–220 milligrams |
| Sugars: | 12–26 grams |
| Protein: | 9–25 grams |

Registered dietitians state that these nutritional drinks are better than a snack, such as a bag of cheese curls and a soda. Although the nutritional drinks are being marketed as meal replacements, dietitians warn that the drinks are an inadequate substitute for three balanced meals. Each 8-ounce can or carton has about 20–25% of the Recommended Daily Allowance of an assortment of vitamins and minerals but lacks fiber and other nutrients found in nature.

These drinks were developed for a variety of conditions, including persons with increased nutritional needs (e.g., athletes and pregnant women), inactive geriatric patients, patients recovering from illness or surgery (who cannot otherwise attend to their needs), and malnourished cancer patients. None have been specially formulated to meet the needs of active seniors and take into account the recent research on micronutrients.

Recent research has suggested that taking sufficient quantities of certain substances rejuvenates aged mitochondria, the failing powerhouses of cell metabolism. Numerous lines of evidence suggest that the organelles of cellular respiration, the mitochondria, degenerate with cellular aging (Shigenaga et al. 1994, PNAS 91, 10771). Unfortunately, the study of mitochondrial aging has been hampered because mitochondria isolated from older cells and host animals are fragile and heterogeneous. Hence, the interpretation of any results is suspect as about half the mitochondria lyse during isolation. Recently, a new method was developed for studying mitochondria in hepatocytes from old animals that avoids this problem (Hagen et al. 1997, PNAS 94, 3064–3069). Mitochondria from older animals are not only more fragile, but have about half the level of cardiolipin, a key lipid unique to mitochondria, without which they cannot maintain a high membrane potential. Furthermore, Hagen et al. show that in hepatocytes from older animals, the mitochondria are lower in membrane potential and leak more toxic oxidants.

Carnitine and carnitine derivatives have been used as metabolites in animal husbandry and for human diet and therapy. U.S. Pat. No. 5,362,753 (Method of increasing the hatchability of eggs by feeding hens carnitine); U.S. Pat. No. 4,687,782 (Nutritional composition for enhancing skeletal muscle adaptation to exercise training); U.S. Pat. No. 5,030,458 (Method for preventing diet-induced carnitine deficiency in domesticated dogs and cats); U.S. Pat. No. 5,030,657 (L-carnitine supplemented catfish diet); U.S. Pat. No. 4,343,816 (Pharmaceutical composition comprising an acylcarnitine, for treating peripheral vascular diseases); U.S. Pat. No. 5,560,928 (Nutritional and/or dietary composition and method of using the same); U.S. Pat. No. 5,504,072 (Enteral nutritional composition having balanced amino acid profile); U.S. Pat. No. 5,391,550 (Compositions of matter and methods for increasing intracellular ATP levels and physical performance levels and for increasing the rate of wound repair); and U.S. Pat. No. 5,240,961 (Method of treating reduced insulin-like growth factor and bone loss associated with aging).

Similarly, mitochondrially active antioxidants including vitamins (especially C, E, B and D), glutathione, N-acetyl cysteine, lipoic acid, etc., have been used variously as human nutritional supplements and in dietary prophylaxis and therapy. For example, applications of lipoic acid have included U.S. Pat. No. 5,607,980 (Topical compositions having improved skin); U.S. Pat. No. 5,472,698 (Composition for enhancing lipid production in skin); U.S. Pat. No. 5,292,538 (Improved sustained energy and anabolic composition and method of making); U.S. Pat. No. 5,536,645 (Nutritive medium for the culture of microorganisms); and U.S. Pat. No. 5,326,699 (Serum-free medium for culturing animal cells).

Age-associated cellular bioenergetic degradation is gaining acceptance as the reason that the current life expectancy is 80 years, but life potential is estimated at 120 years. Bioenergetic degradation may contribute to various diseases of the aged, including heart failure, degenerative brain disease, muscle and vascular diseases, as well as other syndromes. A redox therapy based on coenzyme Q10 has been demonstrated to improve heart functions of old rats and not significantly affect those functions in young rats (Linnane A W, Kovalenki S and Gingold E B. Ann NY Acad Sci 854:202–13, 1998).

Coenzyme Q (or ubiquinone) plays a central role in the mitochondrial respiratory chain that captures energy from metabolism. It exists in mitochondria in the oxidized quinone form under aerobic conditions. In the reduced form ubiquinol, Q10 is an antioxidant. Q also is present in mitochondrial lipids. The structure of Q is very similar to those of the fat soluble vitamins A, D, K and E, which are all derived from isoprenoid structural units. Coenzyme Q10 has one polyisoprenoid side chain composed of ten isoprenoid units. Mitochondria need to maintain a large excess of Q, compared to other respiratory enzymes. Q is required to act on a mobile component of respiration that collects reducing equivalents from the more fixed complexes and passes them to other compounds.

Many conflicting reports have been published on the effectiveness of Q10 in various laboratory and clinical settings. Barbiroli et al. report that Q10 administration caused marked improvement in oxidative phosphorylation in both skeletal muscles and brains of patients with mitochondrial cytopathies due to enzyme defects (Biochimie 80(10): 847–53, 1998). On the other hand, Lass et al. studied the Q9 and Q10 content in brain, heart, skeletal muscle and other organs but found a decrease in mitochondrial Q9 and Q10 only in aging skeletal muscle (Biofactors 9(2–4):199–205, 1999).

Life-long Q10 supplementation was studied in male rats and mice. Q10 did not prolong or shorten the lifespan of rats or mice. Plasma and liver levels were 2.6–8.4 times higher in the supplemented rats. Q10 levels in kidney, heart and brain were not affected by Q10 supplementation (Lonnrot K et al. Biochem Mol Biol Int 44(4):727–37, 1998).

To determine if Q10 has a neuroprotective effect, mice were first treated with Q10 or a control diet for four weeks. Then their striatal nerves were poisoned with 1-Me-4-Ph-1,2,3-tetrahydropyridine (MPTP). The mice continued on their assigned diets for another week before sacrifice. Both groups had considerable damage. However, the Q10-treated mice had 37% higher dopamine and 62% more dense neurons, indicating a protective effect of Q10. (Beal M F et al. Brain Res 783(1):109–14, 1998).

Q10 also blocks the effects of doxorubicin, which stimulates mitochondrial oxidant production and a marked increase in mtDNA deletions in cardiac tissue (Adachi et al. Biochem Biophys Res Commun 195:945–51, 1993).

A group of healthy Finnish men and women aged 28–77 were tested for the total peroxyl radical trapping capacity of human plasma LDL phospholipids. There was an age-related difference in men, but not women. Most of the decrease occurred before age 50, remaining low into the 70's. Supplementation with Q10 doubled the peroxyl radical trapping capacity and thus may decrease LDL oxidation, which contributes to atherosclerosis (Aejmelaeus R et al. Mol Aspects Med 18 Suppl:S113–20, 1997).

Creatine is present in muscular tissue and the heart. Small amounts are found in the blood but not in normal urine. Normally the liver and kidneys produce creatine. When creatine is metabolized, its end product is creatinine, which is excreted in the urine. Serum creatinine may increase with age. Muscle mass usually decreases with age, but it is unknown if it is entirely due to declining activity with age. Also, many older people do not eat as much meat, an important source of creatine. The greater part of creatine in muscle is combined with phosphoric acid as phosphocreatine. There it plays an important part in mitochondrial metabolism. In the mitochondria, creatine kinase isoenzymes transfer high-energy phosphate to creatine. Next, creatine phosphate is transported out of the mitochondria into the cell's environment where it is available to generate extramitochondrial ATP. Different isoenzymes of creatine kinase mediate transfer of high-energy phosphate to and from the various systems that utilize or generate it, for example, muscle contraction and glucose metabolism.

Researchers have administered creatine and have studied a number of different parameters, including aging and muscle function. Acute supplementation (5 days) in men over 60 was found to have no effect in isometric strength and only small increases in isokinetic performance and body mass (Rawson E S, Clarkson P M Int. J. Sports Med 21(1):71–5, 2000). Another study reported results on older adults (67–80 years; 16 females, 16 males) who were randomly assigned to control-creatine, control-placebo, trained-creatine and trained-placebo groups for an 8-week test. Both groups of trained subjects had significant increases in 1- and 12-repetitions maxima, but no beneficial effect was observed for creatine supplementation (Bermon S et al. Acta Physiol Scand 164(2):147–55, 1998). On the other hand, when a different parameter directly related to muscle metabolism was measured, a positive effect was seen after 7 days. Groups of male and female 30-year-olds and 50-year-olds performed single-leg knee-extension exercises inside an MRI chamber. At the start of the study, the older group had lower resting phosphocreatine (PCr) and lower mean initial PCr resynthesis rate. After creatine supplementation, the resting PCr increased 15% (P<0.05) in the young group and 30% (P<0.05) in the middle-aged group. In the middle-aged group, mean initial PCr resynthesis rate increased significantly (P<0.05), to a level comparable to that of the young group. The time to exhaustion was increased in both groups combined after creatine supplementation. Smith SA et al. concluded that creatine supplementation has a greater effect on PCr availability and resynthesis rate in middle-aged compared with younger persons (J Appl Physiol 85(4):1349–56, 1998).

Schuff N et al. analyzed age-related metabolite change and volume loss in the hippocampus by MRI (Neurobiol Aging 29(3):279–85, May-June 1999). They analyzed N-acetyl aspartate (NAA, a neuron marker), volume changes, and ratios of NAA/choline (Cho) and of NAA/Cr (creatine). Volume decreased about 20% between 36 and 85 years, while NAA/Cho decreased by 24% and NAA/Cr decreased by 26%, all of which were significant. The Cho/Cr ratio remained stable. The volume loss correlated with neuronal marker loss and indicated loss of neurons. In contrast, Pfefferbaum A et al. (Magn Reson Med 41(2):276–84, 1999) reported NAA, Cho and Cr signal densities for healthy groups of 15 young and 19 elderly persons. NAA was higher in gray than white matter but did not differ between young and old subjects, despite significant gray matter volume deficits in the older subjects. The available gray matter appeared to be intact in older healthy adults. Cr concentrations were much higher in gray than white matter and significantly higher in the older subjects. Cho concentration in gray matter was also significantly higher in older subjects. The findings in older subjects were confirmed in another study in which Pfefferbaum compared Alzheimer disease (AD) and normal aging (Arch Gen Psychiatry 56(2): 185–92, 1999). Both groups showed deficits in cortical gray matter volume. Gray matter NAA was reduced only in the AD group, compared to older and younger subjects. Cho levels were higher in the AD group versus the normal older group and were higher than in the young group. Gray matter creatine, phosphocreatine and choline concentrations in patients with AD correlated with poorer performance on recognition memory tests.

What is needed is an improved nutritional beverage that is geared to the needs of active, not debilitated, seniors. A survey of nutritional beverage Web sites uncovered that none of the disclosed formulas provide carnitine or lipoic acid. Likewise, a survey of "energy" bars disclosed that none list these ingredients. Such a nutritional drink would also provide the latest in anti-aging compounds that have been shown to increase energy and stamina, with fewer calories.

SUMMARY OF INVENTION

The drawbacks and disadvantages of the prior art are overcome by the nutritional supplement for increased energy and stamina.

The nutritional supplement for increased energy and stamina will improve the diet of individuals, preferably individuals with deficient mitochondrial metabolism. A combination of an effective amount of a suitable antioxidant and an effective amount of a carnitine can be provided in a wide variety of foods and food supplements. Use of these foods and food supplements can improve the diet of not only humans, but also pets, such as dogs, cats, horses, fish, and birds.

A preferred combination includes carnitine in the amount of 0.01 grams (g) to 1.5 g. A preferred form of carnitine is acetyl-L-carnitine (ALCAR). A preferred combination includes the antioxidant in the amount of about 1 g. A preferred form of the antioxidant is R-$\alpha$-lipoic acid. A preferred combination also includes B vitamins. Vitamin B1 (or thiamine mononitrate) is present in the composition at about 1 mg to about 20 mg. Vitamin B2 (or riboflavin) is present in the composition at about 1 mg to about 20 mg. Vitamin B3 as found in niacin is present in the composition at about 1 mg to about 20 mg. Vitamin B3 as found in niacinamide is present in the composition at about 1 mg to about 100 mg. Vitamin B5 as found in d-calcium pantothenate is present in the composition at about 1 mg to about 100 mg. Vitamin B5 as found in pantotheine is present in the composition at about 1 mg to about 50 mg. Vitamin B6 as found in pyridoxine HCl is present in the composition at about 1 mg to about 20 mg. Vitamin B6 as found in pyridoxal-5-phosphate is present in the composition at about 1 mg to about 10 mg. Vitamin B7 (or biotin) is present in the composition at about 1 $\mu$g to about 300 $\mu$g. Vitamin B9 (or folic acid) is present in the composition at about 1 $\mu$g to about 400 $\mu$g. Vitamin B12 (or methylcobalamin) is present in the composition at about 1 $\mu$g to about 1000 $\mu$g. Choline (or choline bitartrate) is present in the composition at about 1 mg to about 50 mg. Inositol is present in the composition at about 1 mg to about 50 mg. Para-amino benzoic acid (or PABA) is present in the composition at about 1 mg to about 30 mg. Optionally, coenzyme Q and/or creatine are added to the combination. Coenzyme Q10 in the amount of about 100 milligrams (mg) and creatine in the amount of about 5 g is preferred.

DETAILED DESCRIPTION

Many foods, including the popular "energy" bars and beverages, lack two important ingredients: carnitine and lipoic acid. These two constituents are essential to discourage aging and provide more energy to older individuals and others with unhealthy mitochondria. Recent research has shown precisely how these two compounds work to promote healthy mitochondria, which are the energy powerhouses of the cells. Mitochondria are responsible for the production of ATP and are present in relatively high numbers in essentially all cells of the body. The mitochondrial electron transport system consumes approximately 85% of the oxygen utilized by a cell. Cellular energy deficits caused by declines in mitochondrial function can impair normal cellular activities and compromise the cell's ability to adapt to various physiological stresses, a major factor in aging. Because of this high oxygen use, the mitochondria also have the highest production of oxidants.

Oxidants damage mitochondria in three important ways. Oxidants damage DNA, lipids and protein. The intramitochondrial DNA (mtDNA) have levels of oxidative damage which are at least 10-fold higher than those of nuclear DNA, which correlates with the 17-fold higher evolutionary mutation rate in mtDNA compared with nuclear DNA. mtDNA oxidation accumulates as a function of age, which has been shown in several species, including humans. This may lead to dysfunctional mitochondria. Mitochondrial protein damage is also age-related and may decrease energy production and increase oxidant production. Oxidative damage to mitochondrial lipids contributes to the decreasing fluidity of cell membranes with age. The lipid cardiolipin is a major component of the mitochondrial membrane and facilitates the activities of key mitochondrial inner membrane enzymes. The aged, damaged mitochondrial membrane cannot contain the oxidants, nor can it maintain as high a polarity as the younger membrane.

Fatty acid oxidation is an important energy source for many tissues. The activity of carnitine-acyl-carnitine exchange across the inner mitochondrial membrane is of great importance. The activity of this exchange reaction is decreased significantly with age, which may be due to a lower intra-mitochondrial pool of carnitine. L-carnitine or acetyl-L-carnitine has been shown to slow or reverse this age-related dysfunction. It also can reverse the age-related decrease in cardiolipin, age-associated decrease in mtDNA transcription, and decreased membrane potential. By itself, L-carnitine or acetyl-L-carnitine cannot correct the problem of excess oxidants. In fact, it was recently reported that carnitine supplementation increased oxidant production by 30% and decreased cell antioxidants markedly. Thus, acetyl-L-carnitine administration in older individuals may contribute to greater oxidative stress.

For the aged mitochondrial engines to run on all cylinders, both carnitine and lipoic acid are essential. Lipoic acid is an antioxidant. And R-α-lipoic acid is a mitochondrial coenzyme that can help reverse the decline in metabolism seen with age. R-α-lipoic acid supplementation has been shown to 1) reverse the age-related decrease in oxygen consumption, 2) restore the age-related decline in mitochondrial membrane potential, 3) triple the ambulatory activity of aged rats, 4) significantly lower the age-related increase in oxidants, and 5) restore glutathione and ascorbic acid levels to youthful levels.

Clearly, both carnitine and lipoic acid contribute to restoration of age-related mitochondria function and metabolic activity in older individuals. This contributes to improvements in energy, general health, mental acuity, immune system function, and skin and hair appearance and muscle mass.

Carnitine is available in many forms and all those are included in the invention of the combination of carnitine and lipoic acid. Carnitine and carnitine derivatives have been used as metabolites in animal husbandry and for human diet and therapy. U.S. Pat. No. 5,362,753 (Method of increasing the hatchability of eggs by feeding hens carnitine); U.S. Pat. No. 4,687,782 (Nutritional composition for enhancing skeletal muscle adaptation to exercise training); U.S. Pat. No. 5,030,458 (Method for preventing diet-induced carnitine deficiency in domesticated dogs and cats); U.S. Pat. No. 5,030,657 (L-carnitine supplemented catfish diet); U.S. Pat. No. 4,343,816 (Pharmaceutical composition comprising an acyl-carnitine, for treating peripheral vascular diseases); U.S. Pat. No. 5,560,928 (Nutritional and/or dietary composition and method of using the same); U.S. Pat. No. 5,504,072 (Enteral nutritional composition having balanced amino acid profile); U.S. Pat. No. 5,391,550 (Compositions of matter and methods for increasing intracellular ATP levels and physical performance levels and for increasing the rate of wound repair); and U.S. Pat. No. 5,240,961 (Method of treating reduced insulin-like growth factor and bone loss associated with aging). Most preferably, the carnitine is acetyl-L-carnitine.

Generally, a daily dosage of carnitine is about 10 milligrams per day (mg/day) to about 8 grams per day (g/day). Preferably, the amount of carnitine in the composition is about 25 mg to about 1,500 mg (or about 0.025 g to about 1.5 g). More preferably, the amount of carnitine given per day is about 1000 mg (or about 1 g) per day. Most preferably, the amount of carnitine in the composition (divided dose) is about 500 mg (or about 0.5 g).

By lipoic acid (or thioctic acid) is meant a mitochondrially active antioxidant that physiologically comprises a metabolically reactive thiol group. Mitochondrially active antioxidants including vitamins (especially C, E, B and D), glutathione, N-acetyl cysteine (NAC), lipoic acid, their derivatives, etc., have been used variously as human nutritional supplements and in dietary prophylaxis and therapy. For example, applications of lipoic acid have included U.S. Pat. No. 5,607,980 (Topical compositions having improved skin); U.S. Pat. No. 5,472,698 (Composition for enhancing lipid production in skin); U.S. Pat. No. 5,292,538 (Improved sustained energy and anabolic composition and method of making); U.S. Pat. No. 5,536,645 (Nutritive medium for the culture of microorganisms); and U.S. Pat. No. 5,326,699 (Serum-free medium for culturing animal cells). Preferably, the compound is at least one of glutathione, N-acetyl cysteine and lipoic acid. Most preferably, the compound is the R-enantiomeric form of lipoic acid. Metabolites of lipoic acid have been found to have a longer half-life and also are suitable for supplementation.

A daily dosage of racemic lipoic acid is generally about 10 mg/day to about 8 g/day. Preferably, the amount of lipoic acid in the composition is about 25 mg to about 1,500 mg (or about 0.025 g to about 1.5 g). More preferably, the amount of lipoic acid in the composition is about 40 mg to about 700 mg (or about 0.040 g to about 0.7 g). Most preferably, the amount of lipoic acid ingested per day is about 400 mg (or 0.4 g). Divided into two pills, each composition contains about 200 mg (or about 0.2 g). If provided as R-lipoic acid, the composition need only contain one half of the racemic mixture, including 200 mg/day and 100 mg per pill.

For optimal utilization of carnitine and lipoic acid, these substances should be administered with an energy source (or carbohydrate source), which can be a variety of known substances. Examples include a natural non-citrus fruit drink, such as grape juice or apple juice, such that it is sufficient to provide between about 50 calories and about 150 calories.

An absence of vitamins in the human diet can lead to illness and disease. B vitamins have proven to be essential for human nutrition. The vitamin B complex comprises a large number of compounds. Traditional members of the vitamin B complex include thiamine, riboflavin, nicotinic acid, pyridoxine, pantothenic acid, biotin, folic acid, cyanocobalamin, choline, inositol, and paraaminobenzoic acid.

Because of their water solubility, any excesses of B vitamins can be excreted in the urine. Therefore, it is rare that B vitamins, except for very high levels of B6 and folate, would accumulate in the human body to toxic levels. For the same reason, the storage of B vitamins in the body is limited and therefore, B vitamins must be ingested regularly. The composition of the present invention contains the B vitamins essential to the human diet.

The concentrations of B vitamins in the composition are as follows. Vitamin B1 (or thiamine mononitrate) is present in the composition at about 1 mg to about 20 mg, with about 12.5 mg preferred. Vitamin B2 (or riboflavin) is present in the composition at about 1 mg to about 20 mg, with about 12.5 mg preferred. Vitamin B3 as found in niacin is present in the composition at about 1 mg to about 20 mg, with about 12.5 mg preferred. Vitamin B3 as found in niacinamide is present in the composition at about 1 mg to about 100 mg, with about 50 mg preferred. Vitamin B5 as found in d-calcium pantothenate is present in the composition at about 1 mg to about 100 mg, with about 50 mg preferred. Vitamin B5 as found in pantotheine is present in the composition at about 1 mg to about 50 mg, with about 25 mg preferred. Vitamin B6 as found in pyridoxine HCl is present in the composition at about 1 mg to about 20 mg, with about 12.5 mg preferred. Vitamin B6 as found in pyridoxal-5-phosphate is present in the composition at about 1 mg to about 10 mg, with about 5 mg preferred. Vitamin B7 (or biotin) is present in the composition at about 1 μg to about 300 μg, with about 150 μg preferred. Vitamin B9 (or folic acid) is present in the composition at about 1 μg to about 400 μg, with about 200 μg preferred. Vitamin B12 (or methylcobalamin) is present in the composition at about 1 μg to about 1000 μg, with about 500 μg preferred. Choline (or choline bitartrate) is present in the composition at about 1 mg to about 50 mg, with about 25 mg preferred. Inositol is present in the composition at about 1 mg to about 50 mg, with about 25 mg preferred. Para-amino benzoic acid (or PABA) is present in the composition at about 1 mg to about 30 mg, with about 15 mg preferred.

Q10 is an important supplement. In groups of males and females ranging from 90–106 years, the prevalence of inadequate Q10 status was 40% for women and 24% for men. In women, the decreased Q10 was associated with impaired natural killer cell effectiveness (p<0.05), indicating decreased abilities to fight infections and to quickly eliminate individual cancer cells as they first develop. Q10 also appears to block programmed cell death, or apoptosis, through its action in the mitochondria (Kagan T et al., Ann NY Acad Sci 887:31–47, 1999). Furthermore, Q10 in its reduced form of ubiquinol-10 that is normally present in the blood, appears to protect human lymphocytes from oxidative damage to their DNA (Tomasetti et al., Free Radic Biol Med 27 (9–10):1027–32, Nov 1999). No important adverse effects have been reported from experiments using daily supplements of up to 200 mg Q10 for 6 to 12 months and 100 mg daily for up to 6 years. (See Overvad K et al. Eur J Clin Nutr 53(10):764–70, 1999).

Q10 also may contribute to anti-aging effect by protecting against atherosclerosis that also results from oxidative stress. (See Pedersen H S, et al., Biofactors 9(2–4): 319–23, 1999). Q10 also improves the tolerance of the senescent myocardium to aerobic and ischemic stress in human atrial tissue and rats. Q10 corrected the age-specific diminished recovery of function in older hearts so that older hearts recovered function at a similar rate to younger ones (See Rosenfeldt F L et al. Biofactors 9(2–4): 291–9, 1999).

As for the supplemental dose of Q10, older Finnish men obtained benefit from 100 mg/day. A woman deficient in Q10 received 150 mg/kg and rapidly improved (Sobriera et al. Neurology 48:1283–43, 1997). Q10 has also been used at dose of about 200 mg/day to help improve heart function in persons with hypertrophic cardiomyopathy.

Based on this information, a supplemental dosage of Q10 can optionally be added to the composition. A preferred amount of Q10 added to the composition is about 20 mg to about 250 mg (or about 0.020 g to about 0.25 g). More preferably, the amount of Q10 in the composition is about 100 mg.

Because creatine intake is often decreased in older individuals, creatine supplementation should be considered. Many athletes have taken doses of creatine up to 75 grams a day for years without known adverse effects, aside from weight gain, often attributed to increased muscle mass. Creatine may be most beneficial when ingested with a natural non-citrus drink, such as grape juice or apple juice, which tends to increase creatine absorption. Often athletes ingest loading doses of 20 g/day divided into four doses for 5 days to one week. Then they take a maintenance dose of 5 g/day. Benefit in one week in older individuals (aged 40–73) has also been seen from a 20 g/day dose, in the form of increased skeletal muscle strength and endurance. It has been reported that about 1.5 g/day to about 25 g/day are safe for periods of at least a year.

Based on this information, a suitable dosage of creatine can optionally be added to the composition. A preferred amount of creatine in the composition is about 0.5 g to about 25 g. A more preferred composition includes about 1 g to about 10 g of creatine. Most preferably, the amount of creatine in the composition is about 5 g. Creatine is available as a salt, monohydrate, phosphate and citrate.

In addition to the compositions mentioned above and the examples given below, breakfast products and dessert products would also benefit from the addition of a carnitine, any of the B vitamins (and combinations thereof), and a form of lipoic acid. Breakfast items include, and are not limited to, breakfast cereal (oatmeal, Total®, etc.), breakfast bars, Poptart® pastry, and quick breakfasts in a bun or taco (e.g., McDonald® Egg McMuffin®). The carnitine, any of the B vitamins (and combinations thereof), and lipoic acid can be added to bulk powders or powder packets, for example, in the following compositions: orange juice (e.g., Tang®), coffee creamer (e.g., Cremora®), powdered milk, powdered milk shakes/smoothies (e.g., MetaRX), butter-flavored powder (e.g., Butter-Buds®), sweetener powders (e.g., NutraSweet®), and spice and herb mixes. Dessert products include, and are not limited to, puddings and gelatins (e.g., JELL-O®), including the sugar-free and sparkling varieties. The carnitine, any of the B vitamins (and combinations thereof), and lipoic acid can be added to bulk powders or powder packets, for example, in the following compositions: pudding (e.g., JELL-O®) and gelatins (e.g., JELL-O®). The combination of carnitine, any of the B vitamins (and combinations thereof), and lipoic acid can be mixed with any cooked or uncooked food.

Premade drinks which would benefit from the inclusion of carnitine, lipoic acid, any of the B vitamins (and combinations thereof), coenzyme Q and creatine include but are not limited to pre-made smoothies, additives to drinks like Jamba Juice® and Starbucks®, sports drinks such as Gatorade®, diet drinks such as Weight Watchers® and Slim Fast®, herbal drinks such as SoBe® (with St. John's Wort and other popular herbs). The formulations with carnitine, any of the B vitamins (and combinations thereof), lipoic acid, coenzyme Q and creatine also can include any fortified foods or meal replacement foods, as discussed above.

The combination of carnitine, lipoic acid, any of the B vitamins (and combinations thereof), coenzyme Q and creatine can be provided in pet formulations, dried or canned or as a supplement for addition thereto. Animals expected to benefit from the composition include but are not limited to dogs, cats, horses, birds and fish. The formulations and/or content of these products are on the product label or are otherwise publicly available.

Additional nutrients are important in older individuals, including but not limited to calcium, vitamin D, Vitamins C or E, iron and zinc. Many of these nutrients have been found to be deficient in the diets of elders and thus can be appropriately supplemented in nutritional beverages and bars of the invention.

A preferred formulation provides lipoic acid, carnitine, any of the B vitamins (and combinations thereof), optionally in combination with coenzyme Q10 and/or creatine, in a timed release formulation to provide a steady supply of the nutrients to the mitochondria which work 24 hours a day. One method of accomplishing timed release is chemically combining the micronutrient(s) with other molecules, which generally slows the process of making the micronutrient(s) available. Also the use of different salts of the micronutrients with different dissolution rates provides for the desired gradual release of each micronutrient.

Besides these methods, two other basic systems are used to control chemical release: coating a core comprising the micronutrient(s) and excipients (coated system) and incorporating the micronutrient(s) into a matrix (matrix system). Coated systems involve the preparation of product-loaded cores and coating the cores with release rate-retarding materials. Product-loaded cores can be formulated as microspheres, granules, pellets or core tablets. There are many known core preparation methods, including, but not limited to, 1) producing granules by top-sprayed, fluidized-bed granulation, or by solution/suspension/powdering layering by Wurster coating; 2) producing spherical granules or pellets by extrusion-spheronization, rotary processing, and melt pelletization; 3) producing core tablets by compression and coating with a release rate-retarding material; and 4) producing microspheres by emulsification and spray-drying.

Matrix systems embed the micronutrient in a slowly disintegrating or non-disintegrating matrix. Rate of release is controlled by the erosion of the matrix and/or by the diffusion of the micronutrient(s) through the matrix. In general, the active product substance, excipients and the release rate-retarding materials are mixed and then processed into matrix pellets or tablets. Matrix pellets can be formed by granulation, spheronization using cellulosic materials, or by melt pelletization using release retardant materials, while matrix tablets are prepared by compression in a tablet press. An example of a cellulosic material is hydroxypropylmethylcellulose as a release-rate retarding material.

Coated or matrix pellets can be filled into capsules or compression tabletted. The rate of release can be further modified by blending coated or matrix pellets with different release rates of the same product to obtain the desired product release profile. Pellets containing any of lipoic acid, carnitine, any of the B vitamins (and combinations thereof), coenzyme Q10, or creatine can be blended to form a combination product.

Convenient assays for the requisite bioactivities are described above or in the references cited herein. For example, cardiolipin content is readily assayed as referenced in Guan, Z. Z., Soderberg, M., Sindelar, P., and Edlund, C. Content and Fatty Acid Composition of Cardiolipin in the Brain of Patients with Alzheimer's Disease. Neurochem. Int. 25: 295–300, 1994, and oxidant production (DCFH) may be assayed as described by LeBel, C. P., Ischiropoulos, H., and Bondy, S. C. Evaluation of the Probe 2',7'-Dichlorofluorescin as an Indicator of Reactive Oxygen Species Formation and Oxidative Stress. Chem. Res. Toxicol. 5: 227–231, 1992. Assays for parameters of aging such as host activity and behavior such as grooming, sexual activity, dominance, coat condition, wound repair, including molecular lesions, muscle strength and tone, kidney appearance and function, etc. are similarly well known in the art.

EXAMPLE 1

Boost® with fiber nutritional beverage (Mead Johnson Nutritionals) has the following aspects and ingredients. Amounts are per 8 fl. oz. container, which is planned to provide 20–25% of the daily requirements.

| Calories, kcal | 250 | Calories from fat | 70 | Protein, g | 11 |
|---|---|---|---|---|---|
| Fat, g | 8 | Saturated fat, g | 1.5 | Carbohydrate, g | 33 |
| Dietary Fiber, g | 3 | Sugars, g | 16 | Water, g | 200 |
| Vitamin A, IU | 830 | Vitamin D, IU | 100 | Vitamin E, IU | 5 |
| Vitamin K, µg | 23 | Vitamin C, mg | 30 | Folic Acid, µg | 100 |
| Thiamin, mg | 0.37 | Riboflavin, mg | 0.43 | Niacin, mg | 5 |
| Vitamin B6, mg | 0.5 | Vitamin B12, µg | 1.5 | Biotin, µg | 75 |
| Pantothenic Acid, mg | 2.5 | Calcium, mg | 200 | Phosphorus, mg | 167 |
| Iodine, µg | 25 | Iron, mg | 3 | Magnesium, mg | 67 |
| Copper, mg | 0.33 | Zinc, mg | 3.3 | Manganese, mg | 0.42 |
| Chloride, mg | 330 | Potassium, mg | 330 | Sodium, mg | 170 |

To create nutritional value for active elders, the above formula is supplemented with about 0.10 g of R-α-lipoic acid and about 0.5 g of acetyl-L-carnitine. At least some of the carbohydrate should be from a natural non-citrus drink, such as grape juice or apple juice. Vitamin(s) B can also be added in the form of Vitamin B1 (or thiamine mononitrate) at about 1 mg to about 20 mg, with about 12.5 mg preferred; Vitamin B2 (or riboflavin) at about 1 mg to about 20 mg, with about 12.5 mg preferred; Vitamin B3 as found in the form of niacin at about 1 mg to about 20 mg, with about 12.5 mg preferred; Vitamin B3 as found in the form of niacinamide at about 1 mg to about 100 mg, with about 50 mg preferred; Vitamin B5 as found in the form of d-calcium pantothenate at about 1 mg to about 100 mg, with about 50 mg preferred; Vitamin B5 as found in the form of pantotheine at about 1 mg to about 50 mg, with about 25 mg preferred; Vitamin B6 as found in the form of pyridoxine HCl at about 1 mg to about 20 mg, with about 12.5 mg preferred; Vitamin B6 as found in the form of pyridoxal-5-phosphate at about 1 mg to about 10 mg, with about 5 mg preferred; Vitamin B7 (or biotin) at about 1 µg to about 300 µg, with about 150 µg preferred; Vitamin B9 (or folic acid) at about 1 µg to about 400 µg, with about 200 µg preferred; Vitamin B12 (or methylcobalamin) at about 1 µg to about 1000 µg, with about 500 µg preferred; Choline (or choline bitartrate) at about 1 mg to about 50 mg, with about 25 mg preferred; Inositol at about 1 mg to about 50 mg, with about 25 mg preferred; and Para-amino benzoic acid (or PABA) at about 1 mg to about 30 mg, with about 15 mg preferred.

Optionally, Q10 is added in the amount of about 100 mg, and creatine in the amount of about 2 g. Furthermore, to take into account the different nutritional needs of older persons, the levels of calcium is increased to about 600 mg (which is half the United States recommended daily allowance (US RDA) of about 1200 mg), magnesium to about 100 mg, and vitamin D to about 600 IU.

EXAMPLE 2

Boost® High Protein Powder (Mead Johnson Nutritionals) is a high-protein, low-fat nutritional powder that can be mixed with skim milk or water. About 54 g of the powder is to be mixed with 8 fluid ounces (fl. oz) of water, and is said to provide at least 25% of the US RDA of most essential vitamins and minerals in 200 calories. It has virtually no fat. When mixed with skim milk, the mixture provides about 290 calories and about 33% of the US RDA of most essential vitamins and minerals.

The water mixture provides the following:

| Protein, g | 13 | Carbohydrate, g | 36 | Sugars, g | 35 |
|---|---|---|---|---|---|
| Water, g | 240 | Vitamin A, IU | 1290 | Vitamin D, IU | 33 |
| Vitamin E, IU | 10 | Vitamin C, mg | 20 | Folic Acid, $\mu$g | 133 |
| Thiamin, mg | 0.4 | Riboflavin, mg | 0.2 | Niacin, mg | 6.8 |
| Vitamin B6, mg | 0.55 | Vitamin B12, $\mu$g | 1 | Biotin, $\mu$g | 93 |
| Pantothenic Acid, mg | 2.7 | Calcium, mg | 290 | Phosphorus, mg | 250 |
| Iodine, $\mu$g | 40 | Iron, mg | 6 | Magnesium, mg | 105 |
| Copper, mg | 0.7 | Zinc, mg | 4 | Manganese, mg | 1 |
| Chloride, mg | 220 | Potassium, mg | 560 | Sodium, mg | 189 |

To properly supply nutrients to active elders, the above formula can be supplemented with about 0.2 g of R-α-lipoic acid and about 0.5 g of acetyl-L-carnitine. At least some of the carbohydrate should be from a natural non-citrus drink, such as grape juice or apple juice. Vitamin(s) B can also be added in the form of Vitamin B1 (or thiamine mononitrate) at about 1 mg to about 20 mg, with about 12.5 mg preferred; Vitamin B2 (or riboflavin) at about 1 mg to about 20 mg, with about 12.5 mg preferred; Vitamin B3 as found in the form is of niacin at about 1 mg to about 20 mg, with about 12.5 mg preferred; Vitamin B3 as found in the form of niacinamide at about 1 mg to about 100 mg, with about 50 mg preferred; Vitamin B5 as found in the form of d-calcium pantothenate at about 1 mg to about 100 mg, with about 50 mg preferred; Vitamin B5 as found in the form of pantotheine at about 1 mg to about 50 mg, with about 25 mg preferred; Vitamin B6 as found in the form of pyridoxine HCl at about 1 mg to about 20 mg, with about 12.5 mg preferred; Vitamin B6 as found in the form of pyridoxal-5-phosphate at about 1 mg to about 10 mg, with about 5 mg preferred; Vitamin B7 (or biotin) at about 1 $\mu$g to about 300 $\mu$g, with about 150 $\mu$g preferred; Vitamin B9 (or folic acid) at about 1 $\mu$g to about 400 $\mu$g, with about 200 $\mu$g preferred; Vitamin B12 (or methylcobalamin) at about 1 $\mu$g to about 1000 $\mu$g, with about 500 $\mu$g preferred; Choline (or choline bitartrate) at about 1 mg to about 50 mg, with about 25 mg preferred; Inositol at about 1 mg to about 50 mg, with about 25 mg preferred; and Para-amino benzoic acid (or PABA) at about 1 mg to about 30 mg, with about 15 mg preferred. Optionally, Q10 is added in the amount of about 100 mg, and creatine in the amount of about 2 g. Furthermore, to take into account the different nutritional needs of older persons, it would be preferable to increase calcium to about 600 mg (half the US RDA of about 1200 mg), and Vitamin D to about 600 IU. These additions would increase powder weight per 8 ounces water to about 56 g.

EXAMPLE 3

Boost® Pudding (Mead Johnson) is labeled for intended use in geriatric patients, malnourished cancer patients and persons desiring weight control. The current formulation provides 240 calories in 5 ounces, low sodium and cholesterol, and 15–20% of the US RDA requirements for most vitamins and minerals. Tailoring the following formulation for use in active elders would be highly beneficial.

| Protein, g | 7 | Fat, g | 9 | Saturated Fat, g | 1.5 |
|---|---|---|---|---|---|
| Sugars, g | 27 | Water, g | 92 | Vitamin A, IU | 750 |
| Vitamin D, IU | 60 | Vitamin E, IU | 4.5 | Vitamin C, mg | 9 |
| Folic Acid, $\mu$g | 60 | Thiamin, mg | 0.23 | Riboflavin, mg | 0.26 |
| Niacin, mg | 3 | Vitamin B6, $\mu$g | 300 | Vitamin B12, $\mu$g | 0.9 |
| Biotin, $\mu$g | 45 | Pantothenic Acid, mg | 1.5 | Calcium, mg | 220 |
| Phosphorus, mg | 220 | Iodine, $\mu$g | 23 | Iron, mg | 2.7 |
| Magnesium, mg | 60 | Copper, mg | 0.3 | Zinc, mg | 2.3 |
| Chloride, mg | 200 | Potassium, mg | 320 | Sodium, mg | 120 |

To formulate this product for active seniors, the following additions and changes are made. The above formula is supplemented with about 0.2 g of R-α-lipoic acid and about 0.5 g of acetyl-L-carnitine. At least some of the sugar should be from a natural non-citrus drink, such as grape juice or apple juice. Vitamin(s) B can also be added in the form of Vitamin B1 (or thiamine mononitrate) at about 1 mg to about 20 mg, with about 12.5 mg preferred; Vitamin B2 (or riboflavin) at about 1 mg to about 20 mg, with about 12.5 mg preferred; Vitamin B3 as found in the form of niacin at about 1 mg to about 20 mg, with about 12.5 mg preferred; Vitamin B3 as found in the form of niacinamide at about 1 mg to about 100 mg, with about 50 mg preferred; Vitamin B5 as found in the form of d-calcium pantothenate at about 1 mg to about 100 mg, with about 50 mg preferred; Vitamin B5 as found in the form of pantotheine at about 1 mg to about 50 mg, with about 25 mg preferred; Vitamin B6 as found in the form of pyridoxine HCl at about 1 mg to about 20 mg, with about 12.5 mg preferred; Vitamin B6 as found in the form of pyridoxal-5-phosphate at about 1 mg to about 10 mg, with about 5 mg preferred; Vitamin B7 (or biotin) at about 1 µg to about 300 µg, with about 150 µg preferred; Vitamin B9 (or folic acid) at about 1 µg to about 400 µg, with about 200 µg preferred; Vitamin B12 (or methylcobalamin) at about 1 µg to about 1000 µg, with about 500 µg preferred; Choline (or choline bitartrate) at about 1 mg to about 50 mg, with about 25 mg preferred; Inositol at about 1 mg to about 50 mg, with about 25 mg preferred; and Para-amino benzoic acid (or PABA) at about 1 mg to about 30 mg, with about 15 mg preferred. Optionally, Q10 is added in the amount of about 100 mg and creatine in the amount of about 2 g. Furthermore, to take into account the different nutritional needs and ingestion patterns of older persons, it would be preferable to increase calcium to about 600 mg (i.e., half the RDA of about 1200 mg), and Vitamin D to about 600 IU.

EXAMPLE 4

A nutritional bar that has been developed for women (e.g., Luna™, from Clif Bar, Inc., Berkeley, Calif.), formulated to meet the needs of active women, with only 180 calories, and has the following nutrient levels: Percents are the portion of minimum daily requirements.

| Total Fat, g | 4 | Saturated Fat, g | 3 | Sodium, mg | 50 |
|---|---|---|---|---|---|
| Potassium, mg | 90 | Total Carbohydrate, g | 26 | Dietary FIber, g | 1 |
| Sugars, g | 15 | Other Carbs, g | 10 | Protein, g | 10 |
| Vitamin A, % | 25 | Vitamin C, % | 100 | Calcium, % | 35 |
| Iron, % | 35 | Vitamin K, % | 100 | Thiamin, % | 100 |
| Riboflavin, % | 100 | Niacin, % | 100 | Vitamin B6, % | 100 |
| Folic Acid, % | 100 | Vitamin B12, % | 100 | Biotin, % | 100 |
| Pantothenic Acid, % | 100 | Phosphorus, % | 35 | Iodine, % | 35 |
| Zinc, % | 35 | Selenium, % | 35 | Copper, % | 35 |
| Manganese, % | 35 | Chromium, % | 35 | Molybdenum, % | 35 |

To convert this product to an inventive formulation for active seniors, the following formulation additions and changes are made. The above formula is supplemented with about 0.2 g of R-α-lipoic acid and about 0.5 g of acetyl-L-carnitine. At least some of the carbohydrate should be from a natural non-citrus drink, such as grape juice or apple juice. Vitamin(s) B can also be added in the form of Vitamin B1 (or thiamine mononitrate) at about 1 mg to about 20 mg, with about 12.5 mg preferred; Vitamin B2 (or riboflavin) at about 1 mg to about 20 mg, with about 12.5 mg preferred; Vitamin B3 as found in the form of niacin at about 1 mg to about 20 mg, with about 12.5 mg preferred; Vitamin B3 as found in the form of niacinamide at about 1 mg to about 100 mg, with about 50 mg preferred; Vitamin B5 as found in the form of d-calcium pantothenate at about 1 mg to about 100 mg, with about 50 mg preferred; Vitamin B5 as found in the form of pantotheine at about 1 mg to about 50 mg, with about 25 mg preferred; Vitamin B6 as found in the form of pyridoxine HCl at about 1 mg to about 20 mg, with about 12.5 mg preferred; Vitamin B6 as found in the form of pyridoxal-5-phosphate at about 1 mg to about 10 mg, with about 5 mg preferred; Vitamin B7 (or biotin) at about 1 µg to about 300 µg, with about 150 µg preferred; Vitamin B9 (or folic acid) at about 1 µg to about 400 µg, with about 200 µg preferred; Vitamin B12 (or methylcobalamin) at about 1 µg to about 1000 µg, with about 500 µg preferred; choline (or choline bitartrate) at about 1 mg to about 50 mg, with about 25 mg preferred; inositol at about 1 mg to about 50 mg, with about 25 mg preferred; and para-amino benzoic acid (or PABA) at about 1 mg to about 30 mg, with about 15 mg preferred. Optionally, Q10 is added in the amount of about 100 mg, and creatine in the amount of about 2 g. Furthermore, to take into account the different nutritional needs and ingestion patterns of older persons, nutrient increases include, but are not limited to, calcium to about 600 mg (half the RDA of about 1200 mg), and Vitamin D to about 600 IU.

EXAMPLE 5

A formulation of flavored gelatin (e.g., JELL-O™) provides 130 calories in 227 g. Tailoring the following formulation for use in active elders would be highly beneficial. Percents are the portion of minimum daily requirements.

| Protein, g | 2 | Fat, g | 0 | Saturated Fat, g | 0 |
|---|---|---|---|---|---|
| Sugars, g | 31 | Vitamin A, % | 6 | Vitamin C, % | 4 |
| Calcium, % | 0 | Iron, % | 2 | Sodium, mg | 75 |

Gelatin flavors can include: apricot, berry blue, black cherry, cherry, cranberry, cranberry raspberry, cranberry strawberry, grape, lemon, lime, mandarin orange, mango, mixed fruit, orange, peach, peach passion fruit, island pineapple, raspberry, strawberry, strawberry banana, strawberry kiwi, watermelon, wild berry, and wild strawberry, among others.

To formulate this product for active seniors, the following additions or changes are made. The above formula is supplemented with about 0.2 g of R-α-lipoic acid and about 0.5 g of acetyl-L-carnitine. At least some of the sugars should be from a natural non-citrus drink, such as grape juice or apple juice. Vitamin(s) B can also be added in the form of Vitamin B1 (or thiamine mononitrate) at about 1 mg to about 20 mg, with about 12.5 mg preferred; Vitamin B2 (or riboflavin) at about 1 mg to about 20 mg, with about 12.5 mg preferred; Vitamin B3 as found in the form of niacin at about 1 mg to about 20 mg, with about 12.5 mg preferred; Vitamin B3 as found in the form of niacinamide at about 1 mg to about 100 mg, with about 50 mg preferred; Vitamin B5 as found in the form of d-calcium pantothenate at about 1 mg to about 100 mg, with about 50 mg preferred; Vitamin B5 as found in the form of pantotheine at about 1 mg to about 50 mg, with about 25 mg preferred; Vitamin B6 as found in the form of pyridoxine HCl at about 1 mg to about 20 mg, with about 12.5 mg preferred; Vitamin B6 as found in the form of pyridoxal-5-phosphate at about 1 mg to about 10 mg, with about 5 mg preferred; Vitamin B7 (or biotin) at about 1 μg to about 300 μg, with about 150 μg preferred; Vitamin B9 (or folic acid) at about 1 μg to about 400 μg, with about 200 μg preferred; Vitamin B12 (or methylcobalamin) at about 1 μg to about 1000 μg, with about 500 μg preferred; choline (or choline bitartrate) at about 1 mg to about 50 mg, with about 25 mg preferred; inositol at about 1 mg to about 50 mg, with about 25 mg preferred; and para-amino benzoic acid (or PABA) at about 1 mg to about 30 mg, with about 15 mg preferred. Optionally, Q10 is added in the amount of about 100 mg and creatine in the amount of about 2 g. Furthermore, to take into account the different nutritional needs and ingestion patterns of older persons, it would be preferable to increase calcium to about 600 mg (i.e., half the RDA of about 1200 mg), and Vitamin D to about 600 IU.

All publications and patent applications cited in this specification are herein incorporated by reference as if each individual publication or patent application were specifically, and individually, indicated to be incorporated by reference.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A gelatin having a composition consisting essentially of:

R-α-lipoic acid in the amount about 0.025 grams to about 1.5 grams;

acetyl-L-carnitine in the amount of about 0.01 grams to about 3 grams;

creatine in the amount of about 0.5 grams to about 25 grams;

coenzyme Q in the amount of about 20 mg to about 250 mg;

a carbohydrate source for calories;

an effective amount of at least one Vitamin B; and flavors.

2. The gelatin of claim 1, wherein the Vitamin B is selected from the group consisting of Vitamin B1, Vitamin B2, Vitamin B3, Vitamin B5, Vitamin B6, Vitamin B7, Vitamin B9, Vitamin B 12, and combinations thereof.

3. The gelatin of claim 1, wherein the carbohydrate source is a natural non-citrus drink.

4. A food bar having a composition consisting essentially of:

R-α-lipoic acid in the amount about 0.025 grams to about 1.5 grams;

acetyl-L-carnitine in the amount of about 0.01 grams to about 3 grams;

creatine in the amount of about 0.5 grams to about 25 grams;

coenzyme Q in the amount of about 20 mg to about 250 mg;

a carbohydrate source sufficient to provide about 50 calories to about 150 calories;

total fat in an amount sufficient to provide about 1 calorie to about 100 calories;

an effective amount of at least one Vitamin B; and flavors.

5. The food bar of claim 4, wherein the Vitamin B is selected from the group consisting of Vitamin B1, Vitamin B2, Vitamin B3, Vitamin B5, Vitamin B6, Vitamin B7, Vitamin B9, Vitamin B12, and combinations thereof.

6. The food bar of claim 4, wherein the carbohydrate source is a natural non-citrus drink.

7. A nutritional beverage having a composition consisting essentially of:

a) R-α-lipoic acid in the amount about 0.025 grams to about 1.5 grams;

b) acetyl-L-carnitine in the amount of about 0.01 grams to about 3 grams;

c) a carbohydrate source sufficient to provide about 50 calories to about 150 calories;

d) total fat in an amount sufficient to provide about 1 calorie to about 100 calories;

e) an effective amount of at least one Vitamin B;

f) flavors;

g) an effective amount of creatine in the amount of about 0.5 grams to about 25 grams;

h) coenzyme Q in the amount of about 20 mg to about 250 mg; and i) sufficient water to solubilize ingredients a) through h).

8. The nutritional beverage of claim 7, wherein the Vitamin B is selected from the group consisting of Vitamin B1, Vitamin B2, Vitamin B3, Vitamin B5, Vitamin B6, Vitamin B7, Vitamin B9, Vitamin B12, and combinations thereof.

9. The nutritional beverage of claim 7, wherein the carbohydrate source is a natural non-citrus drink.

10. A dried beverage mix having a composition consisting essentially of:

R-α-lipoic acid in the amount about 0.025 grams to about 1.5 grams;

acetyl-L-carnitine in the amount of about 0.01 grams to about 3 grams;

creatine in the amount of about 0.5 grams to about 25 grams;

coenzyme Q in the amount of about 20 mg to about 250 mg;

a carbohydrate source sufficient to provide about 50 calories to about 150 calories;

total fat in an amount sufficient to provide about 1 calorie to about 100 calories;

an effective amount of at least one Vitamin B; and flavors.

11. The dried beverage mix of claim 10, wherein the Vitamin B is selected from the group consisting of Vitamin B1, Vitamin B2, Vitamin B3, Vitamin B5, Vitamin B6, Vitamin B7, Vitamin B9, Vitamin B12, and combinations thereof.

12. The dried beverage mix of claim 10, wherein the carbohydrate source is a dried natural non-citrus drink.

* * * * *